United States Patent Office 3,031,142
Patented Apr. 24, 1962

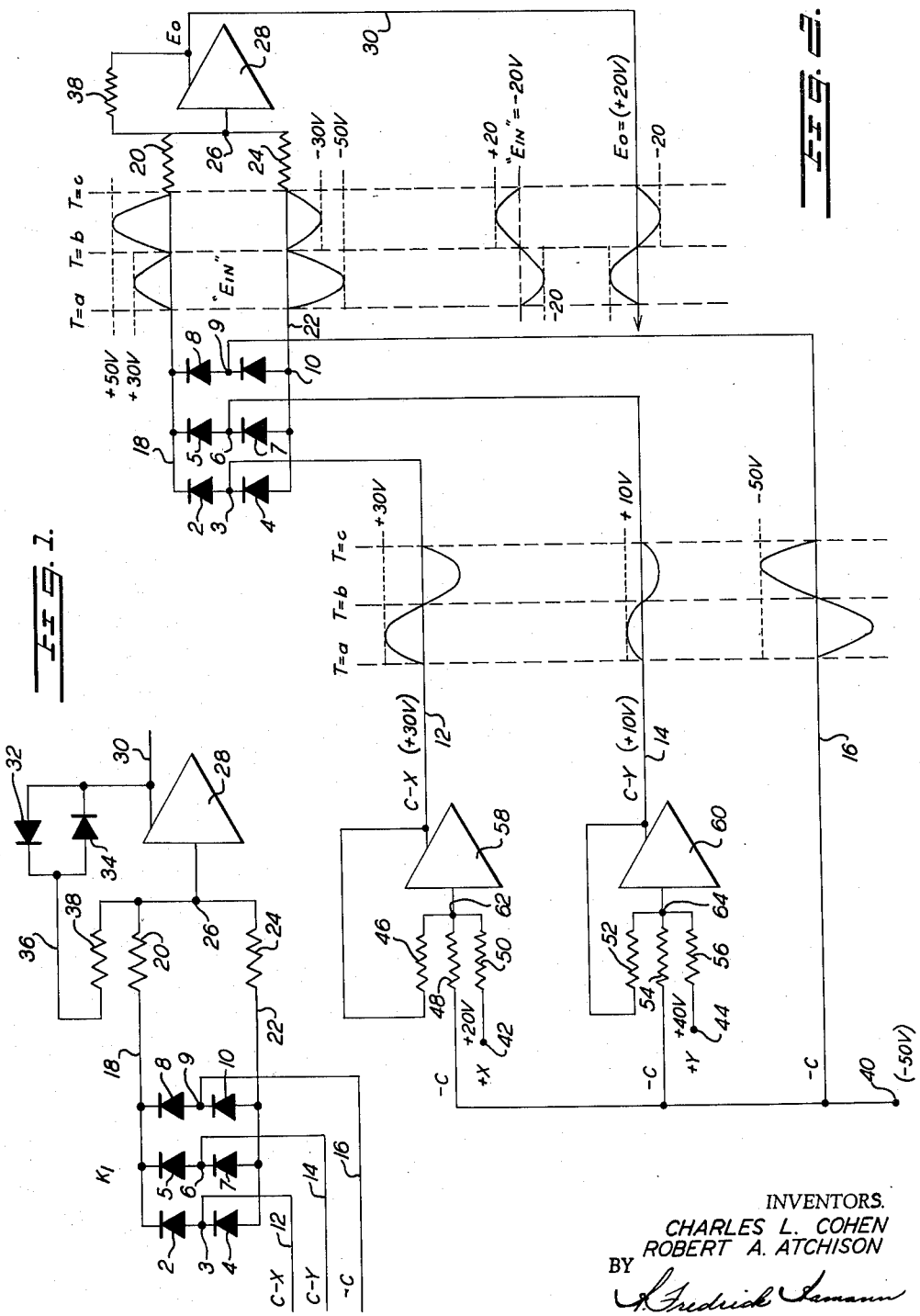

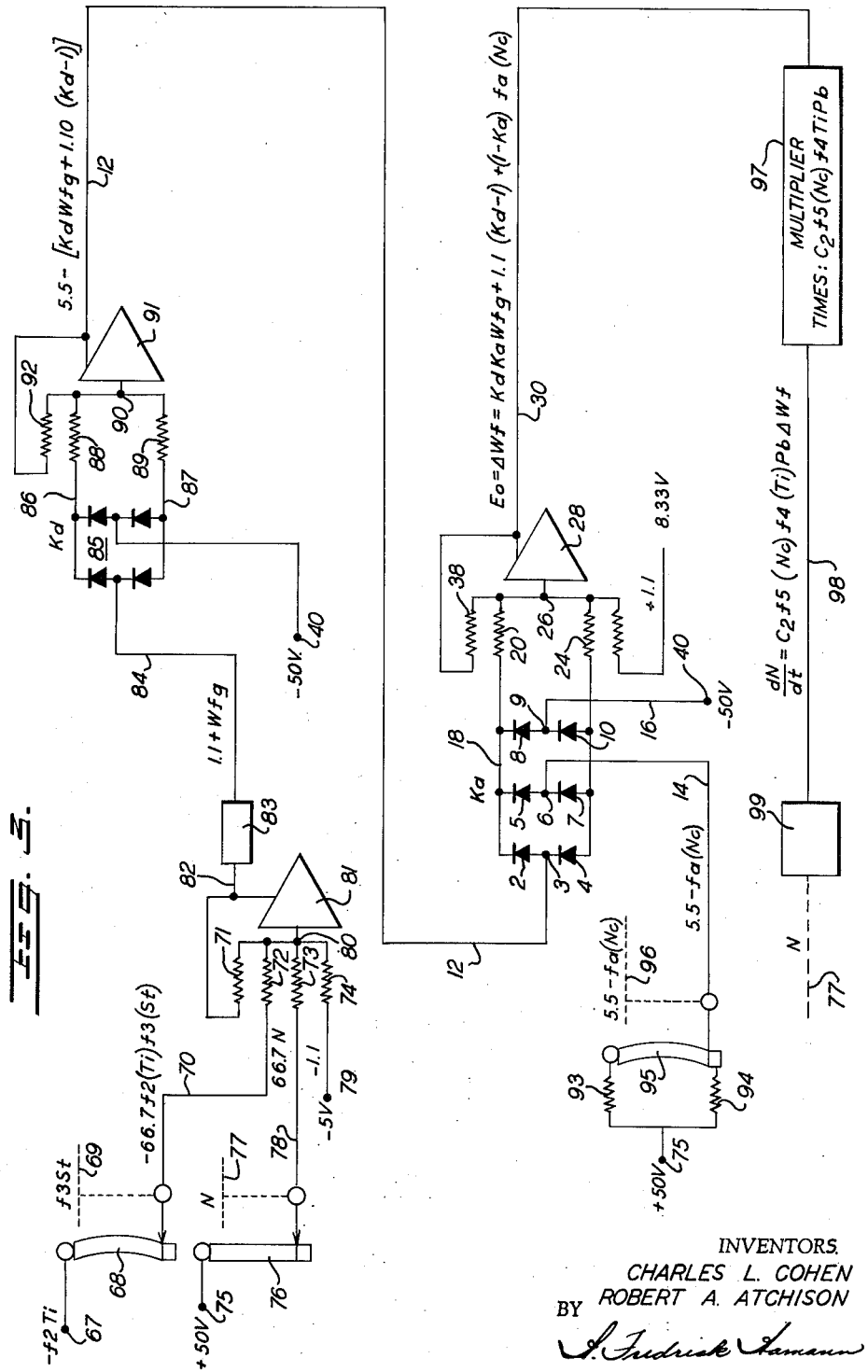

3,031,142
MINIMUM QUANTITY SELECTOR
Charles L. Cohen, Hyattsville, Md., and Robert A. Atchison, Titusville, Fla., assignors to ACF Industries, Incorporated, New York, N.Y., a corporation of New Jersey
Filed May 6, 1958, Ser. No. 733,345
8 Claims. (Cl. 235—193)

This invention pertains to flight simulators and more particularly to circuitry capable of selecting the smaller of a plurality of aerodynamic characteristic quantities. The invention utilizes a plurality of unilateral impedances, such as silicon diodes, to perform the selection of the smaller of a plurality of input quantities represented by voltages. This minimum quantity selector may be used in any computation requiring the selection of the smaller of one or more A.C. voltage quantities and is especially used in the mechanization of algebraic functions such as those of the Boolean type.

In the design and construction of flight simulating apparatus the first step generally is to write equations for the various variable aerodynamic quantities which need to be simulated. The number of such equations depends on the accuracy and completeness of the simulation desired. The end result is a series of simultaneous equations which must be solved in order to have a continuously accurate representation of the aerodynamic values. The mechanization or the construction of apparatus to solve the equation follows the study of the aerodynamic equations. The need for a "smaller" selector often arises in the mechanizing of these equations and is especially useful in mechanizing the transient response in jet engine simulators. In accurate simulation the transient response of tail pipe temperature, fuel flow and engine r.p.m. vs. throttle, Mach and altitude is actually synthesized into a set of equations along with the steady state response. The mechanization of this type of equation is best accomplished by the use of Boolean algebra. It is to the satisfaction of the great need for a minimum quantity selector that this invention is directed.

It is therefore the broad object of this invention to provide a selector for allowing the passage of only the smaller of a plurality of values.

It is a further object to provide means, for use in computation, of selecting the smallest of a plurality of quantities.

It is a still further object of this invention to provide a means for use with flight simulator circuitry for selecting a minimum quantity from two or more quantities.

It is a still further object to provide a circuit for use with Boolean algebra functions for selecting the minimum quantity applied.

The invention embodies other novel features, details of construction and arrangement of parts which are hereinafter set forth in the specification and claims and illustrated in the accompanying drawings, which are hereby made a part of the specification, wherein:

FIG. 1 is a schematic representation of the minimum quantity selector.

FIG. 2 is a schematic representation of the minimum quantity selector including summing amplifiers.

FIG. 3 is a schematic representation of one use of the minimum quantity selector.

In its preferred embodiment the invention comprises means for developing a plurality of voltages analogous to variable aerodynamic quantities and subtracting them from a constant value whose magnitude is equal to or exceeds the maximum value to which the aerodynamic quantities will reach. One method of obtaining these quantities is that shown in U.S. Patent No. 2,742,227 issued to F. W. Bubb, entitled, "Electrical Computer for Solving Simultaneous Equations," which is incorporated herein by reference. The operation of electromechanical shafts in response to the computation of aerodynamic equation may be utilized to position the arms of potentiometers mounted upon these shafts to produce voltage analogs of the aerodynamic quantities. It is from a plurality of such analog voltages that the smaller one may be selected by the use of this minimum quantity selector.

Referring now to FIG. 1 three conductors 12, 14 and 16 bearing voltage quantities are conducted to the junctions 3, 6 and 9 of respective diode pairs 2—4, 5—7, and 8—10. Conductor 18 interconnects the cathode side of diodes 2, 5 and 8 with the input impedance 20 while conductor 22 interconnects the anode side of diodes 4, 7 and 10 with the input impedance 24. This arrangement of diodes may be described as a plurality of diode pairs arranged in parallel. The junction of these two impedances with impedance 38 is designated as terminal 26 and represents the input to summing amplifier 28 whose output 30 represents the desired voltage solution. A feedback from the amplifier output is connected to the diode pair 32 and 34 which are in turn connected by conductor 36 to the feedback impedance 38.

FIG. 2 utilizes the basic circuit shown in FIG. 1 with the same numerical designations except for the feedback path which omits the diode pair 32, 34 and which shows one method for developing the voltages to be used at conductors 12, 14 and 16. FIG. 2 shows a constant amplitude alternating voltage terminal 40 connected to input impedance 48, a variable amplitude alternating voltage input terminal 42, representative of the quantity X, connected to input impedance 50 and a feedback impedance 46 all of which are tied together at junction 62 of summing amplifier 58. The output 12 of summing amplifier 58 represents the quantity constant minus the first variable X. The terminal 40 is also connected to input impedance 54 while a second variable voltage Y is connected to terminal 44 which, in turn, is connected to input impedance 56. The two input impedances 54 and 56 are tied with feedback impedance 52 to the junction 64 of summing amplifier 60. The output 14 of summing amplifier 60 represents the quantity constant minus Y. The constant voltage terminal 40 is also connected by conductor 16 to the diode junction 9 as in FIG. 1.

FIG. 3 which schematically illustrates one application of the minimum quantity selector comprises the basic selector circuit as in FIG. 1 and utilizes the same numerical designation for its parts. The information on conductor 12 is obtained from the system comprising an input terminal 67 which is connected to potentiometer 68. The arm of potentiometer 68 is driven by the mechanical shaft 69 while the voltage picked off by this arm is conducted by conductor 70 to the input impedance 72. A fixed voltage reference 75 is applied to the potentiometer 76 which is driven by mechanical shaft 77 to position an arm along potentiometer 76 to tap a voltage which is fed by conductor 78 to the input impedance 73. A constant voltage applied at terminal 79 is conducted to the input impedance 74. The junction of input impedances 72, 73 and 74 along with feedback impedance 71 are tied at junction 80 which represents the input to summing amplifier 81 whose output 82 is fed back to impedance 71 and also to the limiter 83. The output of the limiter 83 is conducted by connector 84 to one junction of the selector 85 while the other junction of the selector is connected to the minus constant source 40. The output of this selector is connected by conductors 86 and 87 to the input impedances 88 and 89 which are tied at junction 90 which represents the input to summing amplifier 91 whose output 12 is fed back through impedance 92 to the junction 90 and is also fed to the junction 3 of the minimum quantity selector.

The plus constant source 75 is also applied to impedances 93 and 94 which are connected to the ends of potentiometer 95 whose arm is driven by mechanical shaft 96. The voltage appearing on this arm is conducted by connector 14 to junction 6 of the minimum quantity selector. The minus constant voltage is connected from terminal 40 by conductor 16 to the minimum quantity selector diode junction 9. The output 30 of summing amplifier 28 is conducted to the multiplier 97 whose output on conductor 98 is fed to the r.p.m. integrator 99 which drives the r.p.m. shaft 77.

The operation of the minimum quantity selector utilizes voltage quantities of two phases 180° out of phase with each other. Referring to FIG. 1 the quantities $C-X$ and $C-Y$ will be of the same phase which we shall arbitrarily designate as the positive phase. The input minus C of conductor 16 will be of a negative phase, that is 180° out of phase with the voltages on conductors 12 and 14 and will have a magnitude equal to the maximum value that either X or Y can reach or obtain. The minimum quantity selector utilizes the unilateral conduction phenomenon of diodes 2, 4, 5, 7, 8 and 10. The operation is such that the larger of the two quantities $C-X$ and $C-Y$ will pass through the diode pairs 2—4 and 5—7 to conductors 18 and 22 and the opposite phase voltage C will act to subtract, at junction 26, this larger voltage C from the larger of the two quantities $C-X$ and $C-Y$. It is thus seen that if X is smaller than Y the quantity $C-X$ will be larger than the quantity $C-Y$ and therefore the selector will allow $C-X$ to conduct through the diode 2 on its positive going swing and to conduct through diode 4 on its negative going swing. Since the constant voltage C on conductor 16 is out of phase with the quantity $C-X$, when the $C-X$ value is conducting through diode 2 on its positive phase the quantity C is being conducted through diode 10 on its negative going phase and when the quantity $C-X$ is conducting through diode 4 on its negative going operation the positive going quantity $-C$ will conduct through the diode 8. The sum total of the voltages appearing across impedances 20 and 24 will then be equal to the quantity $C-X-C$ which equals $-X$. It is therefore seen that at the junction 26 the smaller of the two quantities X and Y will appear as an A.C. voltage of a negative phase. When this voltage is amplified by the amplifier 28 its phase is shifted 180° resulting in an output at 30 of the same phase as the original quantity X and having the magnitude of the original quantity X. A feedback path through diodes 32 and 34 to conductor 36 and feedback impedance 38 is provided to stabilize the amplifier output and facilitate the use of a high gain amplifier. The diodes 32 and 34 are provided to maintain wave shape accuracy as the output voltage passes through the zero voltage point.

To explain the operation of the minimum quantity selector in greater detail, reference will be had to FIG. 2 in which the smaller quantity X is represented by a +20 volts. The larger quantity Y by +40 volts and the constant minus C by −50 volts. The signs + and − are here used to designate phase. Both quantities X and Y are scaled at 50 volts, that is the maximum value that either X or Y can possibly obtain is 50 volts amplitude. From the figure it is seen that the output 30 of the summing amplifier is plus 20 volts which represents the smaller quantity X. The output of summing amplifier 58 represents $C-X$ and in this example is the sum of the constant voltage −50 and the X variable +20 which yields a magnitude of 30 volts and having been shifted 180° represents $C-X$ and is of a positive phase. The output of summing amplifier 60 represents the summation of $-C+Y$ shifted 180° or 10 volts in magnitude and due to phase shift represents $C-Y$ as a positive phase voltage. The constant value minus C appearing on terminal 40 is of a minus phase and of 50 volt amplitude. During the first half cycle from $T=a$ to $T=b$ the state of the diodes is as follows: diode 2 conducts a plus phase 30 volts, diodes 5, 8, 4 and 7 are cut off while diode 10 conducts a negative phase 50 volts. During the next half cycle from $T=b$ to $T=c$ the state of the diodes is that diodes 2, 5, 7, and 10 are cut off while diode 4 conducts a negative 30 volts and diode 8 conducts a positive 50 volts. The resultant input voltage is shown associated with the conductors 18 and 22. These wave forms are added at summing amplifier 28 and the output voltage is 20 volts and of course represents X, the smaller of the two quantities X and Y. It can thus be seen that the diode circuitry made up of diodes 2, 4, 5, 7, 8 and 10 comprises a magnitude selector, and a minimum quantity selection is obtained by subtracting X and Y from the same constant at the inputs to summing amplifiers 58 and 60 respectively. At the outputs of these amplifiers therefore the smaller quantity is represented by a larger voltage. Thus while this device utilizes a maximum voltage selector it performs the function of a minimum quantity selector.

This minimum quantity selector is often utilized in mechanizing Boolean algebraic functions. Boolean algebra by definition is the science of symbols denoting logical propositions and their combination according to certain rules which correspond to the laws of logic. By reference to FIG. 1 the Boolean function $K_1$ is mechanized where $K_1=1$ when $X \leq Y$, 0 otherwise. The output of amplifier 28 is the sum of the inputs as modified by the diode selector or:

$$-(C-X)K_1-(C-Y)(1-K_1)+C=E_0$$

By expanding we get $$-CK_1+XK_1-C+Y+CK_1-YK_1+C=E_0$$

and $XK_1+Y(1-K_1)=E_0$. Thus we have mechanized $-K_1$.

This principle is especially useful in mechanizing the transient response in jet engine simulators. In flight simulators, the transient response of tailpipe temperature, fuel flow and engine r.p.m. vs. throttle, Mach and altitude is actually synthesized into a set of equations, along with the steady state response. The mechanization of this type of equation is best accomplished by the use of Boolean algebra. The minimum quantity selector is often used in this application, one example being shown in FIG. 3.

The equations for $dN/dt$, rate of change of r.p.m., are shown in a simplified form to illustrate a usage of the minimum quantity selector.

Equations:

$$\frac{dN}{dt}=C2f5(N_c)f4(T_i)P_b\Delta\omega f$$

$$\Delta f=K_dK_aW_{fg}+1.10(K_d-1)+(1-K_a)f_a(N_c)$$

$$W_{fg}=66.7[f3(S_t)f2(T_i)-N]$$

$$N_c=1.057Nf4(T_i)$$

$K_a=1.0$ when $W_{fg} \leq f_a(N)$, 0 otherwise $K_d=1.0$ when $W_{fg} > -1.10$ $$P_b \sim \frac{\text{Burner pressure}}{\text{Maximum burner pressure}}$$

Definitions:
 $S_t$=throttle position
 $N$=engine r.p.m.
 $T_i$=total inlet temperature The output 30 of summing amplifier 28 is developed as follows:

$$E_0=-\{5.5-[K_dW_{fg}+1.10(K_d-1)]\}(K_a) \\ -\{5.5-f_a(N)\}(1-K_a)+6.6-1.1 \quad (1)$$

Expanding we get:

$$E_0=-5.5K_a+K_aK_dW_{fg}+1.10K_aK_d-1.10K_a \\ -5.5+f_a(N)+5.5K_a-K_af_a(N)+6.6-1.1 \quad (2)$$

Combining terms:

$$E_0 = K_a K_d W_{fg} + (1-K_a)f_a(N) + K_a(K_d-1)1.10 \quad (3)$$

Since $K_a=1.0$ when $W_{fg} \leq f_a(N)$ and $K_d=1.0$ when $W_{fg} > -1.10$ (where $f_a(N)$ is positive and represents the rate at which the engine accelerates)

It is clear that when $K_a=0$, $K_d=1$ and vice versa. Therefore:

$$K_a(K_d-1)1.10 = (K_d-1)1.10 \quad (4)$$

Substituting Equation 4 into Equation 3 we get:

$$E_0 = K_a K_d W_{fg} + 1.1(K_d-1) + (1-K_a)f_a(N) \quad (5)$$

But Equation 5 is the definition of $\Delta W_f$, $$\therefore \Delta W_f = K_a K_d W_{fg} + 1.1 + (K_d-1) + (1-K_a)f_a(N) \quad (6)$$

To illustrate the physical significance of this equation, assume that the throttle is pushed all the way forward when the engine is at idle r.p.m. Thus, the engine is at a much lower speed than the throttle calls for and must accelerate at some rate to get to its steady state value; this rate will be determined by some function of r.p.m., e.g., $f_a(N)$, modified by burner pressure $(P_b)$ and total inlet temperature $(T_1)$. It will be seen from the equation of $\Delta W$ (incremental fuel flow) that if $K_a=0$ and $K_d=1$ we will have the desired result.

To be more specific, one can see from FIG. 3 that when the throttle $(S_t)$ is maximum and r.p.m. is at a low value $W_{fg}$ will be a large positive value. In fact, in one type of engine the following results will be obtained for a "throttle burst" or rapid opening of the throttle at low r.p.m., at zero Mach, sea level, and standard day.

$S_t=1$ (maximum setting)
$N=63.1\%$ (idle r.p.m.)
$T_1=288°$ K. (standard day)
$N_c=66.7\%$ (corrected idle r.p.m.)
$W_{fg}=21.03$ but limited to 3.14
$f_d(N_c)=2.181$
$\therefore K_a=0$ since $W_{fg} > f_a(N_c)$
$K_d=1$ since $W_{fg} > -1.1$ and $$\Delta W_f = K_d K_a W_{fg} + 1.1(K_d-1) + (1-K_a)f_a(N_c)$$
$$= (1)(0)W_{fg} + 1.1(1-1) + (1-0)f_a(N_c)$$
$$= f_a(N_c)$$
$$= 2.181$$

$dN/dt = .0089 \Delta W$
$dN/dt = .0198 = 1.98$ r.p.m./sec. Thus the engine will accelerate at a rate determined by $f_a(N_c)$.

In the above example, the input to junction 3 of the minimum quantity selector is $5.5 - W_{fg}$ and to junction 6 is $5.5 - f_a(N_c)$ while the output of amplifier 28 is $f_a(N_c)$. Since $f_a(N_c)=2.181$ and $W_{fg}=3.14$ (limited) it is clear that the circuitry works as a minimum quantity selector.

A similar analysis can be performed for a condition where the engine must decelerate, then $K_d=0$ and $K_a=1$; it is then clear that:

$$\Delta W_f = -1.1 \text{ and the engine will decelerate.}$$

Still referring to FIG. 3, the analog voltages are developed by multiplying the function of inlet temperature on terminal 67 by the throttle position function potentiometer 68 to provide a voltage via conductor 70 to the input impedance 72. This value is summed with an r.p.m. analog voltage from potentiometer 76 and a constant voltage applied at terminal 79. These values are summed at amplifier 81 and the output sent to limiter 83 whose output represents $1.1 + W_{fg}$. This voltage is conducted by connector 84 to a junction of the larger diode selector 85 the other junction having a constant $-50$ volts applied at terminal 40 and scaled to be equal to a $-6.6$ quantity. The output of amplifier 91, therefore, represents $5.5 - [K_d W_{fg} + 1.10(K_d-1)]$. This quantity is sent by means of conductor 12 to the junction 3 of the minimum quantity selector. The quantity $5.5 - f_a(N_c)$ is developed by the potentiometer 95 which has an arm driven by the mechanical position of corrected r.p.m. shaft 96. The constant scaled value $-6.6$ is applied to junction 9 of the minimum quantity selector. It is thus seen that the quantity on conductor 12 is equivalent to the $C-X$ quantity of FIG. 1; that the quantity on conductor 14 is equivalent to the quantity $C-Y$ of FIG. 1; and the quantity or voltage appearing on conductor 16 is equivalent to the constant $-C$ of FIG. 1. The diodes 2, 4, 5, 7, 8, 10 here act in the same manner as in the previous FIG. 1 description to provide inputs by means of impedances 20 and 24 to the summing amplifier 28. In this case, a separate input equivalent to $+1.1$ is added to the summing amplifier to make up for the difference between the 5.5 quantities appearing on conductors 12 and 14 and the 6.6 quantity scaling on conductor 16. The output of summing amplifier 28 is therefore:

$$E_0 = \Delta W_f = K_d K_a W_{fg} + 1.1(K_d-1) + (1-K_a)f_a(N_c)$$

This quantity on conductor 30 is connected to the multiplier 97 which multiplies $C2 f5(N_c) f4(T_1)(P_b)$. This output is equivalent to $dN/dt$ and represents the voltage derivative of the r.p.m. function and when sent through an integrator shaft 99 acts as the motivating analog voltage to position the r.p.m. or N shaft 77. This example shows the great usefulness of the minimum quantity selector by providing an inexpensive accurate method of selecting the minimum of a plurality of quantities for use in the mechanization of aerodynamic quantities as used in flight simulators.

The minimum quantity selector is not limited to two inputs other than the constant input but may be made up of any number of quantities subtracted from the constant and sent to diode pairs such as herein shown and described.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. In a minimum quantity selector, constant voltage producing means, a plurality of variable quantity voltage means for producing a plurality of variable quantity voltages whose amplitude is equal to or less than that produced by the constant voltage means, difference means connected to said voltage producing means for producing difference voltages equivalent to the numerical difference between the constant voltage and each of the variable quantity voltages, means connected to said difference means and constant voltage means for passing only the largest difference voltage, and summing means connected to the last mentioned means and simultaneously responsive to the largest difference voltage and the constant voltage for producing a resulting voltage equivalent to the smallest variable quantity voltage.

2. In a minimum quantity selector, constant voltage means for producing a constant alternating voltage of fixed phase, a plurality of difference voltage means for providing a plurality of alternating voltages of a phase opposite that of the constant voltage and each of which is of an amplitude equal to the difference between the said constant voltage and one of a plurality of variable quantity voltages each of which is of a magnitude equal to or less than the said constant voltage, diode means for selecting the largest of the plurality of difference voltages and algebraically summing the largest difference voltage and the constant voltage for producing a voltage proportional to the smallest variable quantity voltage.

3. Apparatus according to claim 2, wherein said diode means comprises a plurality of serially connected diode pairs arranged in parallel relationship, said constant voltage means being connected to the junction between one pair of diodes and said difference voltage means being connected to the junctions of other diode pairs.

4. In a minimum quantity selector, constant alternating voltage producing means, first and second variable quantity voltage producing means, difference means for producing two alternating difference voltages of a phase opposite that of the constant voltage and equivalent in amplitude to the constant voltage minus the first variable quantity and the constant voltage minus the second variable quantity, the said first and second variable quantity voltages being limited to a value equal to or less than the said constant voltage, means comprising a plurality of serially connected diode pairs arranged in parallel relationship for allowing only the conduction of the larger difference voltage and summing the constant voltage with the larger difference voltage for producing a resulting voltage equivalent to the smaller variable quantity voltage.

5. In a minimum quantity selector, constant alternating voltage means of fixed phase, a plurality of difference voltage means for providing a plurality of alternating voltages of a phase opposite that of the constant voltage and each of which is of an amplitude equal to the difference between the said constant voltage and one of a plurality of variable quantity voltages, each variable quantity voltage being limited in magnitude to a value equal to or less than the value of the said constant voltage, diode means for selecting the largest of the plurality of difference voltages and algebraically summing the largest difference voltage and the constant voltage for producing a voltage proportional to the smallest variable quantity voltage, said diode means comprising a plurality of serially connected diode pairs arranged in parallel relationship.

6. In a smaller quantity selector, constant alternating voltage means of fixed phase, first and second difference voltage means for providing a first and second alternating voltage of a phase opposite that of the constant voltage and each of which has an amplitude equal to the difference between the said constant voltage and one of two variable quantity voltages, each of the two variable quantity voltages having a magnitude equal to or less than the said constant voltage, diode means for selecting the larger difference voltage, said diode means comprising a plurality of serially connected diode pairs arranged in parallel relationship, and means for algebraically summing the larger difference voltage with the constant voltage for producing a voltage proportional to the smaller variable quantity voltage, said summing means including a pair of serially connected impedances connected in parallel with said pairs of diodes and an amplifier connected to the junction between said resistors.

7. In a smaller quantity selector, constant alternating voltage means of fixed phase, first and second difference voltage means for providing a first and second alternating voltage of a phase opposite that of the constant voltage and each of which has an amplitude equal to the difference between the said constant voltage and one of two variable quantity voltages whose amplitude does not exceed that of the said constant voltage, diode means for selecting the larger difference voltage and means for algebraically summing the larger difference voltage and the constant voltage for producing a voltage proportional to the smaller variable quantity voltage.

8. In a minimum quantity selector, A.C. voltage means of a given phase, first variable A.C. voltage means of opposite phase to the constant voltage, and having a magnitude equal to or less than the constant voltage, second variable A.C. voltage means of opposite phase to the constant voltage, and having a magnitude equal to or less than the constant voltage, first summing means connected so as to algebraically sum the constant voltage with the first variable voltage so as to produce a first output equivalent in amplitude to the constant voltage minus first variable voltage, second summing means connected so as to algebraically sum the constant voltage with the second variable voltage so as to produce a second output equivalent in amplitude to the constant voltage minus second variable voltage, diode means for selecting the larger of the first and second outputs and subtracting the larger output from the constant voltage for producing voltage proportional to the smaller variable A.C. voltage.

References Cited in the file of this patent

UNITED STATES PATENTS

| | | |
|---|---|---|
| 2,676,286 | Buchner | Apr. 20, 1954 |
| 2,701,305 | Hopper | Feb. 1, 1955 |
| 2,752,489 | Aigrain | June 26, 1956 |
| 2,819,397 | Davis | Jan. 7, 1958 |
| 2,832,886 | Morrill | Apr. 27, 1958 |

OTHER REFERENCES

Analog Methods in Computation and Simulation (Soroka) 1954, pages 91 and 92.

Electronics (Morrill et al.) November 1952, pages 122–126.

A Palimpsest on the Electronic Analog Art Edited by H. M. Paynter (Philbrick) 1955, pages 276–280.

Korn and Korn, Electronic Analog Computers, McGraw-Hill Book Co., 1952 (page 277).